US011029422B2

(12) United States Patent
Daibenzeiher et al.

(10) Patent No.: US 11,029,422 B2
(45) Date of Patent: Jun. 8, 2021

(54) RADIOMETRIC MEASURING APPARATUS

(71) Applicant: Berthold Technologies GmbH & Co. KG, Bad Wildbad (DE)

(72) Inventors: Tobias Daibenzeiher, Birkenfeld (DE); Steffen Mueller, Pforzheim (DE); Ewald Freiburger, Neulingen (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 60 days.

(21) Appl. No.: 16/693,581

(22) Filed: Nov. 25, 2019

(65) Prior Publication Data

US 2020/0183021 A1  Jun. 11, 2020

(30) Foreign Application Priority Data

Dec. 10, 2018  (EP) .................................. 18211309.2

(51) Int. Cl.
*G01T 1/208* (2006.01)
*G01T 1/20* (2006.01)

(52) U.S. Cl.
CPC ............ *G01T 1/208* (2013.01); *G01T 1/2018* (2013.01)

(58) Field of Classification Search
CPC .............................. G01T 1/208; G01T 1/2018
See application file for complete search history.

(56) References Cited

U.S. PATENT DOCUMENTS 10,180,502 B2  1/2019  Moermann et al.

FOREIGN PATENT DOCUMENTS

| CN | 104355216 A | 2/2015 |
|---|---|---|
| DE | 10 2017 208 723 A1 | 11/2018 |
| EP | 0 742 505 A2 | 11/1996 |
| EP | 3 064 910 A1 | 9/2016 |

*Primary Examiner* — Edwin C Gunberg
(74) *Attorney, Agent, or Firm* — Crowell & Moring LLP

(57) ABSTRACT

A radiometric measuring apparatus detects a measured variable in the form of a fill level, a point level, a density and/or a mass flow, and includes a scintillator embodied to generate light pulses upon excitation by ionizing radiation, an optoelectronic sensor embodied to convert the light pulses into a sensor signal, a first signal processing unit embodied to process the sensor signal into a first measured variable signal, an adjustable second signal processing unit embodied in a measurement setting to process the sensor signal into a second measured variable signal, wherein the second measured variable signal corresponds to the first measured variable signal in the case of a correctly processing first signal processing unit and a correctly processing second signal processing unit, and embodied in at least one operation setting to process the sensor signal into at least one operating variable signal, wherein the at least one operating variable signal does not correspond to the measured variable signals, a setting unit embodied to set the second signal processing unit into the measurement setting in measured variable time intervals and into the at least one operation setting in operating variable time intervals that alternate with the measured variable time intervals, and an assessment unit embodied to compare the first measured variable signal and the second measured variable signal with one another and to assess the first signal processing unit and/or the second signal processing unit to be processing correctly or incorrectly, depending on a result of the comparison.

18 Claims, 3 Drawing Sheets

Fig. 5

| Interval | I | II | III | IV | V | VI | VII | VIII |
|---|---|---|---|---|---|---|---|---|
| 4a | MSW -> MI MZI | MSW -> MI | MSW -> MI | MSW -> MI | MSW -> MI | MSW -> MI | MSW -> MI | MSW -> MI |
| 4b | MSW -> MI MZI | BSW1 -> RI BZI1 | BSW3 -> HTMI BZI3 | BSW2 -> RKPI BZI2 | BSW1 -> RI BZI1 | BSW3 -> HTMI BZI3 | BSW4 -> HSI BZI4 | MSW -> MI MZI |

ZDM ← → , ZF' ← → , ZDB ← → , ZF'' ← →

Fig. 6

| Interval | I | II | III | IV | V | VI | VII | VIII | IX |
|---|---|---|---|---|---|---|---|---|---|
| 4a | MSW -> MI MZI | MSW -> MI | MSW -> MI | MSW -> MI | MSW -> MI | MSW -> MI | MSW -> MI | MSW -> MI | MSW -> MI |
| 4b | MSW -> MI MZI | BSW3 -> HTMI BZI3 | BSW2 -> RKPI BZI2 | BSW3 -> HTMI BZI3 | BSW1 -> RI BZI1 | BSW3 -> HTMI BZI3 | BSW4 -> HSI BZI4 | BSW3 -> HTMI BZI3 | MSW -> MI MZI |

ZDM ← → , ZF' ← → , ZDB ← → , ZF'' ← →

RADIOMETRIC MEASURING APPARATUS

CROSS REFERENCE TO RELATED APPLICATION

This application claims priority under 35 U.S.C. § 119 from European Patent Application No. 18 211 309.2, filed Dec. 10, 2018, the entire disclosure of which is herein expressly incorporated by reference.

BACKGROUND AND SUMMARY OF THE INVENTION

The invention relates to a radiometric measuring apparatus for detecting a measured variable in the form of a fill level, a point level, a density and/or a mass flow.

The invention is based on the object of providing a radiometric measuring apparatus for detecting a measured variable in the form of a fill level, a point level, a density and/or a mass flow, said radiometric measuring apparatus having improved properties.

This object is achieved by the provision of a radiometric measuring apparatus according to the claimed invention.

The inventive, more particularly electrical, radiometric measuring apparatus is embodied or configured to detect, more particularly automatically detect, a measured variable, more particularly a value of a measured variable, in the form of a fill level, a point level, a density and/or a mass flow. The radiometric measuring apparatus comprises a scintillator device, more particularly only one scintillator device, an optoelectronic sensor device, more particularly only one optoelectronic sensor device, a first signal processing unit, more particularly a first electrical signal processing unit, an adjustable second signal processing unit, more particularly an adjustable second electrical signal processing unit, a setting unit, more particularly an electrical setting unit, and an assessment unit, more particularly an electrical assessment unit. The scintillator device is embodied or configured to generate light pulses upon excitation by ionizing radiation, in particular in a temporally continuous or ongoing or pause-free fashion. The optoelectronic sensor device is embodied or configured to convert, more particularly automatically convert, the light pulses into a sensor signal, more particularly into at least one sensor signal, in particular in a temporally continuous or ongoing or pause-free fashion, at least one of said sensor signals more particularly being an electrical sensor signal. The first signal processing unit is embodied or configured to process, more particularly automatically process, the sensor signal, more particularly the at least one sensor signal, into a first measured variable signal, more particularly a first electrical measured variable signal, in particular in a temporally continuous or ongoing or pause-free fashion, more particularly to detect the measured variable. The second signal processing unit is embodied or configured in a measurement setting, more particularly a measurement setting for detecting the measured variable, to process, more particularly automatically process, the sensor signal, more particularly the at least one sensor signal, into a second measured variable signal, more particularly a second electrical measured variable signal, in particular in a temporally continuous or ongoing or pause-free fashion, more particularly to detect the measured variable. The second measured variable signal corresponds to, more particularly equals, the first measured variable signal in the case of a correctly processing first signal processing unit and correctly processing second signal processing unit. Moreover, the second signal processing unit is embodied or configured in at least one operation setting, more particularly an operation setting for detecting at least one disturbance variable or an operation setting in which disturbance variables can be detected, to process, more particularly automatically process, the sensor signal, more particularly the at least one sensor signal, into at least one operating variable signal, more particularly at least one electrical operating variable signal, in particular in a temporally continuous or ongoing or pause-free fashion, more particularly for detecting the at least one disturbance variable. The at least one operating variable signal does not correspond to the measured variable signals. The setting unit is embodied or configured to set, more particularly automatically set, the second signal processing unit into the measurement setting in measured variable time intervals, more particularly predetermined measured variable time intervals, and into the at least one operation setting in operating variable time intervals, more particularly predetermined operating variable time intervals, that alternate with the measured variable time intervals. The assessment unit is embodied or configured to compare, more particularly automatically compare, the first measured variable signal, more particularly a value of the first measured variable signal, and the second measured variable signal, more particularly a value of the second measured variable signal, in particular provided these are present, with one another and to assess, more particularly automatically assess, the first signal processing unit and/or the second signal processing unit to be processing correctly or incorrectly, depending on a result of the comparison, in particular in a temporally continuous or ongoing or pause-free fashion.

Firstly, a relatively large functional scope of the radiometric measuring apparatus, in particular in the case of only two signal processing units, is facilitated thereby, more particularly by the adjustable second signal processing unit and the setting unit or the second measured variable signal and the at least one operating variable signal.

Secondly, a functional safety, more particularly a safety integrity level (SIL) of at least SIL2, of the radiometric apparatus, in particular in the case of only two signal processing units, is facilitated thereby, more particularly by the first signal processing unit, the second signal processing unit and the assessment unit or the comparison between the first measured variable signal and the second measured variable signal and the assessment. More particularly, the functional safety may be advantageous in the process industry.

In particular, the radiometric measuring apparatus may comprise only the first signal processing unit and the second signal processing unit. This can facilitate a relatively low power consumption of the radiometric measuring apparatus. Alternatively, the radiometric measuring apparatus may comprise at least one further signal processing unit in addition to the first signal processing unit and the second signal processing unit.

In the case of only two signal processing units in particular, more time may be needed for the processing, more particularly the sequential processing, into the second measured variable signal, in particular in the measured variable time intervals, and into the at least one operating variable signal, in particular in the operating variable time intervals, than in the case of structures carried out in parallel, particularly if there are more than two signal processing units which, in particular, may have a relatively higher power consumption. However, the additional time, should this be required, may not or need not be disadvantageous. This particularly holds true if the at least one operating variable signal need not be available all too frequently, for example since at least one variable, more particularly at least one disturbance variable on which the at least one operating variable signal, more particularly at least one value of the at least one operating variable signal, may depend, may have the property of not changing in the short term. Additionally or alternatively, the measured variable time intervals may or need only be so long or only have such a duration that the comparison and the assessment or the functional safety can be ensured.

In particular, the first signal processing unit and the second signal processing unit, more particularly in each case, may be referred to as signal processing channel or signal processing path. Further additionally or alternatively, the first signal processing unit and the second signal processing unit may differ. Further additionally or alternatively, the first measured variable signal and the second measured variable signal may differ. Further additionally or alternatively, the measurement setting and the at least one operation setting may differ. Further additionally or alternatively, the second signal processing unit can be embodied to be set in the measurement setting or in the at least one operation setting, more particularly either in the measurement setting or in the at least one operation setting, at one time. Further additionally or alternatively, the second signal processing unit can be embodied to process the sensor signal into the second measured variable signal or into the at least one operating variable signal, more particularly either into the second measured variable signal or into the at least one operating variable signal, at one time. Further additionally or alternatively, the setting unit can be embodied to set the second signal processing unit into the measurement setting or into the at least one operation setting, more particularly either into the measurement setting or into the at least one operation setting, at one time. Further additionally or alternatively, the measured variable time intervals and the operating variable time intervals can differ. Further additionally or alternatively, the measured variable time intervals and the operating variable time intervals, more particularly in each case, can be referred to as time slots.

Further additionally or alternatively, the setting unit can comprise a time determination and/or measuring unit, such as a clock and/or an oscillator, for example.

Further additionally or alternatively, the assessment unit can be embodied to directly or indirectly compare the first measured variable signal and the second measured variable signal with one another, more particularly by means of a comparison of signals based, more particularly in each case based, on the first measured variable signal and the second measured variable signal. Further additionally or alternatively, the assessment unit can comprise, more particularly be, a voting logic, more particularly a 1oo2 (1 out of 2) voting logic. Particularly in the case of a correctly processing first signal processing unit and a correctly processing second signal processing unit, or in the case where the first signal processing unit and the second signal processing unit process correctly, more particularly each process correctly, the first measured variable signal and the second measured variable signal can be linked to one another, particularly in the temporal mean, in particular in linear fashion; in particular these may be comparable or correspond to one another, more particularly equal one another. In the case of an incorrectly processing first signal processing unit and/or incorrectly processing second signal processing unit, or in the case where the first signal processing unit and/or the second signal processing unit process incorrectly, more particularly each process incorrectly, the first measured variable signal and the second measured variable signal may not or need not be linked to one another, particularly in the temporal mean; in particular these may be incomparable or not correspond to one another or deviate from one another. In particular, the assessment unit can be embodied to assess the first signal processing unit and the second signal processing unit, more particularly in each case, to be processing correctly in the case of a deviation of less than or equal to ten percent (%) and to assess these to be processing incorrectly in the case of a deviation of more than ten %. Further additionally or alternatively, if no current second measured variable signal is present or available, more particularly in the operating variable time intervals, the assessment unit can be embodied to compare the temporally most recent second measured variable signal and the first measured variable signal with one another and/or to use the temporally most recent comparison result and/or to use the temporally most recent assessment, in particular until the next measured variable time interval in time. Further additionally or alternatively, the assessment unit can comprise, more particularly be, a CPU or a microcontroller or a signal processor.

Further additionally or alternatively, the scintillator device and/or the optoelectronic sensor device, more particularly in each case, can be assessed by the radiometric measuring apparatus, more particularly the assessment unit, as generating and/or converting correctly or incorrectly on account of the characteristic properties or principles of said scintillator device and/or optoelectronic sensor device. Further additionally or alternatively, the ionizing radiation, in particular an intensity of the ionizing radiation, may depend on the measured variable. In this respect, reference is also made to the relevant literature in the art.

Further additionally or alternatively, the optoelectronic sensor device can be coupled, more particularly optically coupled, to the scintillator device. Further additionally or alternatively, the first signal processing unit can be coupled, more particularly electrically coupled, to the optoelectronic sensor device. Further additionally or alternatively, the second signal processing unit can be coupled, more particularly electrically coupled, to the optoelectronic sensor device. Further additionally or alternatively, the setting unit can be coupled, more particularly electrically coupled, to the second signal processing unit. Further additionally or alternatively, the assessment unit can be coupled, more particularly electrically coupled, to the first signal processing unit and/or the second signal processing unit.

In one development of the invention, the setting unit is embodied to repeatedly, more particularly periodically, set the second signal processing unit into the measurement setting and into the at least one operation setting. Expressed differently: a measured variable time interval and an operating variable time interval can repeatedly, more particularly periodically, alternate. This may facilitate the functional safety and the functional scope of the radiometric apparatus being ensured in a temporally continuous or ongoing or pause-free fashion.

In one development of the invention, the first signal processing unit is embodied to process the sensor signal from a time window into the first measured variable signal. The second signal processing unit is embodied to process the same sensor signal from the same time window into the second measured variable signal when in the measurement setting. The setting unit is embodied to intermittently set the second signal processing unit into the measurement setting in such a way that the second signal processing unit processes the same sensor signal from the same time window into the second measured variable signal. The assessment unit is embodied to compare the first measured variable signal and the second measured variable signal, which were both processed from the same sensor signal from the same time window, with one another. This facilitates a relatively good comparability of the first measured variable signal and the second measured variable signal.

In one development of the invention, the first signal processing unit is embodied to process the sensor signal, more particularly at least one sensor signal, into the first measured variable signal only or exclusively. This allows the first measured variable signal to be present or available at all times and/or allows the radiometric measuring apparatus, more particularly the first signal processing unit, to have a relatively simple embodiment. In particular, the first signal processing unit may not or need not have an adjustable embodiment and/or be embodied to process the sensor signal into the first measured variable signal in a measurement setting and into at least one operating variable signal in at least one operation setting. Additionally or alternatively, the setting unit may not or need not be coupled, more particularly directly coupled, to the first signal processing unit and/or be embodied to set the first signal processing unit into the measurement setting in measured variable time intervals and into the at least one operation setting in operating variable time intervals that alternate with the measured variable time intervals. Alternatively, the first signal processing unit can have an adjustable embodiment and can be embodied to process the sensor signal into the first measured variable signal in a measurement setting and into at least a first operating variable signal in at least one operation setting. The setting unit can be coupled, more particularly electrically coupled, to the first signal processing unit and/or can be embodied to set the first signal processing unit into the measurement setting in measured variable time intervals and into the at least one operation setting in operating variable time intervals that alternate with the measured variable time intervals.

In one development of the invention, the first signal processing unit and/or the second signal processing unit each have a comparator and/or a monostable trigger circuit. In particular, the first measured variable signal and/or the second measured variable signal and/or the at least one operating variable signal can be a pulsed measurement signal or have measurement pulses, more particularly can each be a pulsed measurement signal or each have measurement pulses. Additionally or alternatively, the comparator can be disposed upstream of the monostable trigger circuit, more particularly the associated monostable trigger circuit.

In one configuration of the invention, a threshold of the comparator of the second signal processing unit is adjustable to a measurement threshold for the measurement setting and to at least one operation threshold that differs from the measurement threshold for the at least one operation setting. In particular, the setting unit can be embodied to set the threshold of the comparator of the second signal processing unit to the measurement threshold in the measured variable time intervals and to the at least one operation threshold in the operating variable time intervals. Additionally or alternatively, a threshold of the comparator of the first signal processing unit can correspond to, more particularly equal, the measurement threshold. Additionally or alternatively, a threshold of the comparator of the first signal processing unit can be set or fixed and/or the threshold of the comparator of the first signal processing unit need not or cannot be adjustable. Alternatively, a threshold of the comparator of the first signal processing unit can be adjustable to a measurement threshold for the measurement setting and to at least one operation threshold, which differs from the measurement threshold, for the at least one operation setting. In particular, the setting unit can be embodied to set the threshold of the comparator of the first signal processing unit to the measurement threshold in the measured variable time intervals and to the at least one operation threshold in the operating variable time intervals.

In one development of the invention, the first measured variable signal and the second measured variable signal each contain a measurement information item, in particular a first or second measurement information item, more particularly a value of the measurement information item. Additionally or alternatively, the at least one operating variable signal contains a closed-loop control information item, more particularly a value of the closed-loop control information item, a noise edge position information item, more particularly a value of the noise edge position information item, a high temperature measurement information item, more particularly a value of the high temperature measurement information item, and/or a cosmic ray information item, more particularly a value of the cosmic ray information item. This facilitates the relatively large functional scope of the radiometric measuring apparatus, more particularly within a measured variable time interval and at most four operating variable time intervals, in particular a closed-loop control operating variable time interval, a noise edge position operating variable time interval, a high temperature operating variable time interval and/or a cosmic ray operating variable time interval. In particular, the cosmic ray information item allows the scintillator device and/or the optoelectronic sensor device, more particularly in each case, to be assessed as producing and/or converting correctly or incorrectly. In particular, a high temperature operating threshold for the high temperature measurement information item can be elevated in relation to the measurement threshold for the measurement information item. Additionally or alternatively, a closed-loop control operation threshold for the closed-loop control information item can be elevated, in particular elevated again, in relation to the measurement threshold for the measurement information item. Further additionally or alternatively, a cosmic ray operation threshold for the cosmic ray information item can be elevated, in particular elevated again, in relation to the measurement threshold for the measurement information item. Further additionally or alternatively, a noise edge position operation threshold for the noise edge position information item can be reduced in relation to the measurement threshold for the measurement information item. Further additionally or alternatively, the noise edge position information item and/or the closed-loop control information item need not be available all too frequently since the disturbance variable(s) to be compensated, on which the noise edge position information item and/or the closed-loop control information item may depend, may have the property of not changing in the short term, particularly since it/they may substantially depend on temperature influences and/or aging effects. Further additionally or alternatively, a time duration, more particularly a respective time duration, of the measured variable time interval, of the closed-loop control operating variable time interval, of the noise edge position operating variable time interval, of the high temperature operating variable time interval and/or of the cosmic ray operating variable time interval can be matched to the respective task. By way of example, the time duration of the closed-loop control operating variable time interval may be longer. This may allow a bias voltage control to have better statistics. Further additionally or alternatively, the assessment unit can be embodied to compare the first measurement information item and the second measurement information item with one another. Further additionally or alternatively, the first operating variable signal may have a first high temperature measurement information item, more particularly a value of the first high temperature measurement information item, if the first signal processing unit has an adjustable embodiment. Additionally, the assessment unit can be embodied to compare the first operating variable signal including the first high temperature measurement information item and the operating variable signal, more particularly the second operating variable signal, including the high temperature measurement information item, more particularly the second high temperature measurement information item, with one another. Further additionally or alternatively, the radiometric measuring apparatus can comprise a temperature measuring device, more particularly a temperature sensor.

In one configuration of the invention, the assessment unit is embodied or configured to monitor, more particularly automatically monitor, the noise edge position information item, in particular provided this is present, in respect of whether a noise edge position threshold is reached and/or exceeded, in particular in a temporally continuous or ongoing or pause-free fashion. Should the noise edge position threshold be reached and/or exceeded, the setting unit is embodied or configured to lengthen, more particularly automatically lengthen, a ratio of a time duration, more particularly a respective time duration, of the operating variable time intervals, more particularly of one operating variable time interval, for processing the operating variable signal containing the high temperature measurement information item to a time duration of the measured variable time intervals, more particularly of one measured variable time interval, in relation to the undershot case. This facilitates continued operation, more particularly continued operation of the radiometric measuring apparatus, and there need not be a measurement termination, more particularly a termination of the measurement by the radiometric measuring apparatus, on account of a noise edge that is too high and on account of errors arising therefrom. In particular, the measurement information item can be incorrect in the reached and/or overshot case and consequently the shortened time duration, more particularly the time duration shortened in relative terms, of the measured variable time intervals, more particularly of the measured variable time interval, may not or need not represent a further disadvantage. Additionally or alternatively, the lengthened time duration, more particularly the time duration lengthened in relative terms, of the high temperature operating variable time intervals, in particular of the high temperature operating variable time interval, may allow the compensation, in particular the at least partial compensation, of a lower sensitivity of the signal processing unit, more particularly of the second signal processing unit, in the high temperature operation setting in relation to the measurement setting. Further additionally, the first measured variable signal and/or the second measured variable signal including the measurement information item can be used for the measured variable in the undershot case and the operating variable signal including the high temperature measurement information item can be used for the measured variable in the reached and/or overshot case, said measured variable being able to be used by the radiometric measuring apparatus in particular. Further additionally or alternatively, the setting unit can be coupled, more particularly electrically coupled, to the assessment unit.

In one development of the invention, the measured variable time intervals have a different time duration, more particularly a shorter time duration, more particularly each have a different time duration, more particularly a shorter time duration, than the operating variable time intervals, more particularly in each case. Additionally or alternatively, the measured variable time intervals have, more particularly each have, a time duration from 10 milliseconds (ms), more particularly from 100 ms, to 300 seconds (s), more particularly to 10 s. Additionally or alternatively, the operating variable time intervals have, more particularly each have, a time duration from 50 ms, more particularly from 500 ms, to 900 s, more particularly to 100 s.

In one development of the invention, the optoelectronic sensor device comprises at least one photodiode, more particularly at least one semiconductor photodiode, more particularly at least one avalanche photodiode, more particularly at least one array of photodiodes, more particularly at least one silicon photomultiplier. This can facilitate a relatively low power consumption of the radiometric measuring apparatus. Alternatively, the optoelectronic sensor device may comprise at least one vacuum photomultiplier tube or at least one electron tube.

In one development of the invention, the radiometric measuring apparatus comprises an interface, more particularly an electrical interface. The interface is embodied or configured to couple, more particularly electrically couple, the radiometric measuring apparatus to a receiver, more particularly an electrical and/or external receiver, for data transfer purposes, more particularly electrical data transfer purposes, more particularly for data interchange purposes. The radiometric measuring apparatus is embodied or configured to be supplied with electrical power, more particularly operating power, only or exclusively via its interface, in particular by the receiver. In particular, this may be facilitated by the relatively low power consumption of the radiometric measuring apparatus, as described above. This renders flexible use of the radiometric apparatus possible. Additionally or alternatively, this facilitates the transfer of the first measured variable signal and/or the second measured variable signal, more particularly of the measurement information item, and/or of a signal based on, more particularly in each case based on, the first measured variable signal and/or the second measured variable signal and/or of the operating variable signal, more particularly the high temperature measurement information item, and/or of a signal based on the operating variable signal including the high temperature measurement information item, provided the high temperature measurement information item is present, and/or of the measured variable, more particularly a value of the measured variable. In particular, the interface can be an analog current interface, more particularly a so-called 4 to 20 mA current loop, a digital current interface, a mixed analog/digital interface, a fieldbus interface or a two-wire interface. Additionally or alternatively, the interface can be a Modbus interface, a Profibus interface, a Hart interface, a FOUNDATION fieldbus interface or an ethernet interface. Further additionally or alternatively, the radiometric measuring apparatus may not or need not comprise a further power supply, e.g., in the form of a dedicated power supply unit.

In one development of the invention, the radiometric measuring apparatus comprises a malfunction output and/or transfer unit, more particularly an electrical malfunction output and/or transfer unit. The malfunction output and/or transfer unit is embodied or configured to output and/or transfer, more particularly automatically output and/or transfer, a malfunction signal, more particularly an electrical malfunction signal, in particular by means of the interface, in particular provided said malfunction signal is present, if the first signal processing unit and/or the second signal processing unit is/are assessed to be processing incorrectly. This allows a user of the radiometric measuring apparatus to be informed about the processing incorrectly assessment. Additionally, the malfunction output and/or transfer unit can be embodied to output and/or transfer a noise or high temperature signal, more particularly an electrical noise or high temperature signal, in particular by means of the interface, in particular provided said noise or high temperature signal is present, should the noise edge position information item reach and/or exceed the noise edge position threshold. Further additionally or alternatively, the malfunction output and/or transfer unit can be coupled, more particularly electrically coupled, to the assessment unit.

In one development of the invention, the first measured variable signal and the second measured variable signal, more particularly in each case, more particularly the measurement information item, in particular provided this is present, contain a measured variable value of the measured variable. Additionally or alternatively, the radiometric measuring apparatus, in particular a determination unit of the radiometric measuring apparatus, more particularly an electrical determination unit of the radiometric measuring apparatus, is embodied or configured to determine, more particularly automatically determine, a measured variable value of the measured variable on the basis of the first measured variable signal and/or the second measured variable signal, in particular respectively, more particularly on the basis of the measurement information item, in particular provided this is present. Additionally, the operating variable signal including the high temperature measurement information item, in particular provided this is present, may include a measured variable value of the measured variable. Further additionally or alternatively, the radiometric measuring apparatus, in particular a determination unit of the radiometric measuring apparatus, more particularly an electrical determination unit of the radiometric measuring apparatus, can be embodied to determine a measured variable value of the measured variable on the basis of the operating variable signal including the high temperature measurement information item, in particular provided this is present. Further additionally or alternatively, the determination unit, in particular provided this is present, may comprise, more particularly be, a CPU or a microcontroller or a signal processor. Further additionally or alternatively, the radiometric measuring apparatus may comprise a data memory, more particularly a nonvolatile data memory, for storing a measured variable determination factor.

In one configuration of the invention, the radiometric measuring apparatus comprises at least one counter, more particularly at least one electrical counter, and/or at least one analog-to-digital converter, more particularly an electrical analog-to-digital converter, for determining, more particularly for automatically determining, the measured variable value on the basis of the first measured variable signal and/or the second measured variable signal, in particular respectively, more particularly on the basis of the measurement information item, in particular provided this is present. In particular, the first measured variable signal and/or the second measured variable signal and/or the at least one operating variable signal can be a pulsed measurement signal or have measurement pulses, more particularly can each be a pulsed measurement signal or each have measurement pulses. Additionally, the at least one counter and/or the at least one analog-to-digital converter can be embodied to determine the measured variable value on the basis of the operating variable signal including the high temperature measurement information item, in particular provided this is present.

In one development of the invention, the radiometric measuring apparatus comprises a common housing. The scintillator device, the optoelectronic sensor device, the first signal processing unit, the second signal processing unit, the setting unit and the assessment unit are disposed in the common housing. Additionally, the interface, the malfunction output and/or transfer unit, the determination unit, the at least one counter and/or the at least one analog-to-digital converter, in particular provided these are present, may be disposed in the common housing. Further additionally or alternatively, the common housing can be embodied as an explosion prevention housing.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a temporal sequence of time intervals, more particularly in the case where a noise edge position threshold is undershot by a noise edge position information item.

FIG. 6 shows a further temporal sequence of time intervals, more particularly in the case where the noise edge position threshold is reached and/or exceeded by the noise edge position information item.

DETAILED DESCRIPTION OF THE DRAWINGS

Figure 1:
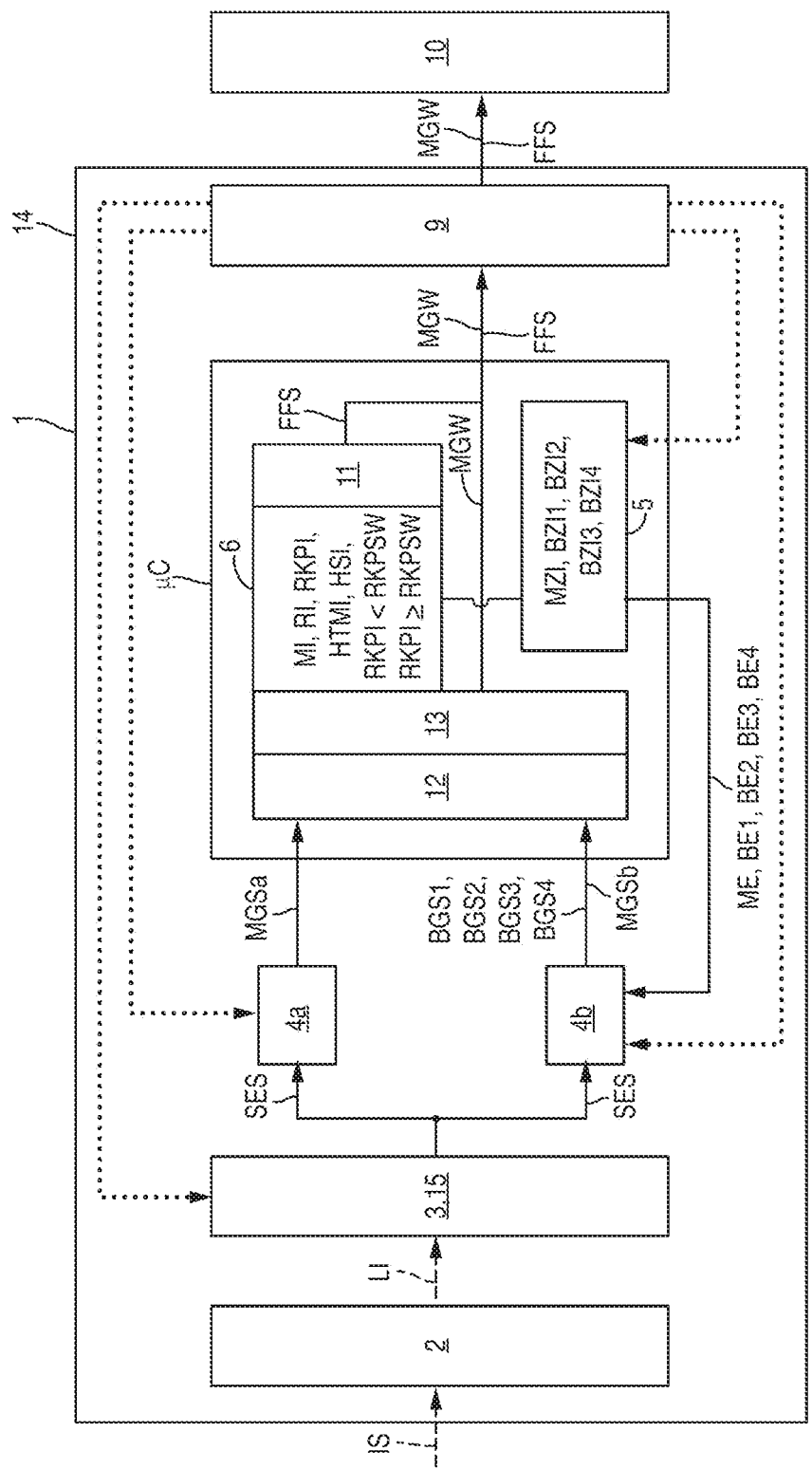
FIG. 1 shows a radiometric measuring apparatus according to an embodiment of the invention.

FIG. 1 shows a radiometric measuring apparatus 1 for detecting a measured variable MG in the form of a fill level, a point level, a density and/or a mass flow. The radiometric measuring apparatus 1 comprises a scintillator device 2, an optoelectronic sensor device 3, a first signal processing unit 4a, an adjustable second signal processing unit 4b, a setting unit 5 and an assessment unit 6. The scintillator device 2 is embodied to generate light pulses LI upon excitation by ionizing radiation IS. The optoelectronic sensor device 3 is embodied to convert the light pulses LI into a sensor signal SES, more particularly an electrical sensor signal. The first signal processing unit 4a is embodied to process the sensor signal SES into a first measured variable signal MGSa, more particularly a first electrical measured variable signal. The second signal processing unit 4b is embodied in a measurement setting ME to process the sensor signal SES into a second measured variable signal MGSb, more particularly a second electrical measured variable signal. The second measured variable signal MGSb corresponds to, more particularly equals, the first measured variable signal MGSa in the case of a correctly processing first signal processing unit 4a and a correctly processing second signal processing unit 4b. Moreover, the second signal processing unit 4b is embodied in at least one operation setting BE1, BE2, BE3, BE4 to process the sensor signal SES into at least one operating variable signal BGS1, BGS2, BGS3, BGS4. The at least one operating variable signal BGS1, BGS2, BGS3, BGS4 does not correspond to the measured variable signals MGSa, MGSb. The setting unit 5 is embodied to set the second signal processing unit 4b into the measurement setting ME in measured variable time intervals MZI and into the at least one operation setting BE1, BE2, BE3, BE4 in operating variable time intervals BZI1, BZI2, BZI3, BZI4 that alternate with the measured variable time intervals MZI, as shown in FIGS. 5 and 6. The assessment unit 6 is embodied to compare the first measured variable signal MGSa and the second measured variable signal MGSb with one another and to assess the first signal processing unit 4a and/or the second signal processing unit 4b to be processing correctly or incorrectly, depending on a result of the comparison.

In the shown exemplary embodiment, the radiometric measuring apparatus 1 comprises a microcontroller C. The microcontroller C comprises the setting unit 5 and the assessment unit 6.

Moreover, the optoelectronic sensor device 3 is optically coupled to the scintillator device 2, as indicated by a dashed line in FIG. 1. Moreover, the first signal processing unit 4a is electrically coupled to the optoelectronic sensor device 3, as indicated by a solid line in FIG. 1. Further, the second signal processing unit 4b is electrically coupled to the optoelectronic sensor device 3, as indicated by a solid line in FIG. 1. Moreover, the setting unit 5 is electrically coupled to the second signal processing unit 4b, as indicated by a solid line in FIG. 1. Moreover, the assessment unit 6 is electrically coupled to the first signal processing unit 4a and the second signal processing unit 4b, as indicated by a solid line in FIG. 1.

In detail, the setting unit 5 is embodied to repeatedly set, more particularly periodically set, the second signal processing unit 4b into the measurement setting ME and into the at least one operation setting BE1, BE2, BE3, BE4.

Moreover, the first signal processing unit 4a is embodied to process the sensor signal SES from a time window ZF', ZF" into the first measured variable signal MGSa, as shown in FIG. 5 for a time interval I and a time interval VIII and as shown in FIG. 6 for a time interval I and a time interval IX. The second signal processing unit 4b is embodied to process the same sensor signal SES from the same time window ZF', ZF" into the second measured variable signal MGSb in the measurement setting ME. The setting unit 5 is embodied to set the second signal processing unit 4b intermittently into the measurement setting ME in such a way that the second signal processing unit 4b processes the same sensor signal SES from the same time window ZF', ZF" into the second measured variable signal MGSb. The assessment unit 6 is embodied to compare the first measured variable signal MGSa and the second measured variable signal MGSb with one another, said measured variable signals having been processed from the same sensor signal SES from the same time window ZF', ZF".

In FIG. 1, the assessment unit 6 compares the first measured variable signal MGSa and the second measured variable signal MGSb, which were processed from the same sensor signal SES from the same time window ZF', ZF", with one another and assesses the first signal processing unit 4a and/or the second signal processing unit 4b to be processing correctly or incorrectly, depending on a result of the comparison.

In detail, the first signal processing unit 4a is embodied to process the sensor signal SES into the first measured variable signal MGSa only, as shown in FIGS. 5 and 6.

Figure 2:
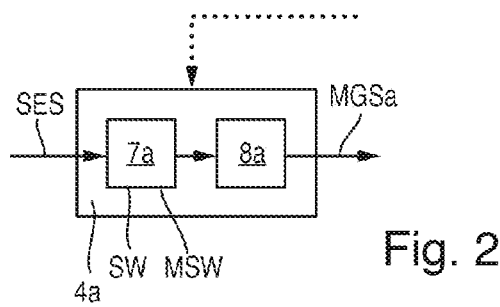
FIG. 2 shows a first signal processing unit of the radiometric measuring apparatus of FIG. 1.
Figure 3:
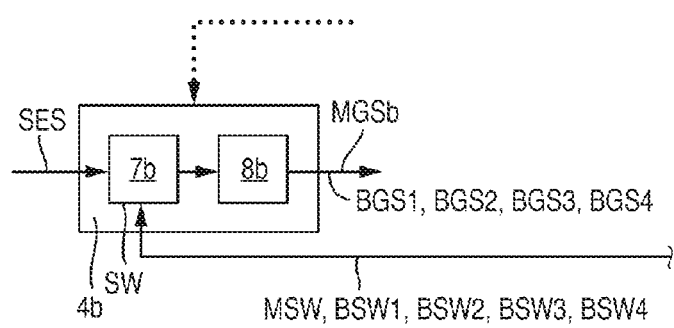
FIG. 3 shows an adjustable second signal processing unit of the radiometric measuring apparatus of FIG. 1.

Further, the first signal processing unit 4a and the second signal processing unit 4b each have a comparator 7a, 7b and a monostable trigger circuit 8a, 8b, as shown in FIGS. 2 and 3.

In particular, the first measured variable signal MGSa and the second measured variable signal MGSb and the at least one operating variable signal BGS1, BGS2, BGS3, BGS4 have measurement pulses, more particularly each have measurement pulses.

In detail, a threshold SW of the comparator 7b of the second signal processing unit 4b is adjustable to a measurement threshold MSW for the measurement setting ME and to at least one operation threshold BSW1, BSW2, BSW3, BSW4 that differs from the measurement threshold MSW for the at least one operation setting BE1, BE2, BE3, BE4, as shown in FIG. 3.

Additionally, a threshold SW of the comparator 7a of the first signal processing unit 4a is fixed and in particular corresponds to, more particularly equals, the measurement threshold MSW, as shown in FIG. 2.

Moreover, the first measured variable signal MGSa and the second measured variable signal MGSb each include a measurement information item MI, as shown in FIGS. 5 and 6.

Additionally, the at least one operating variable signal BGS1, BGS2, BGS3, BGS4 in the shown exemplary embodiment includes a closed-loop control information item RI, a noise edge position information item RKPI, a high temperature measurement information item HTMI and a cosmic ray information item HSI.

Figure 4:
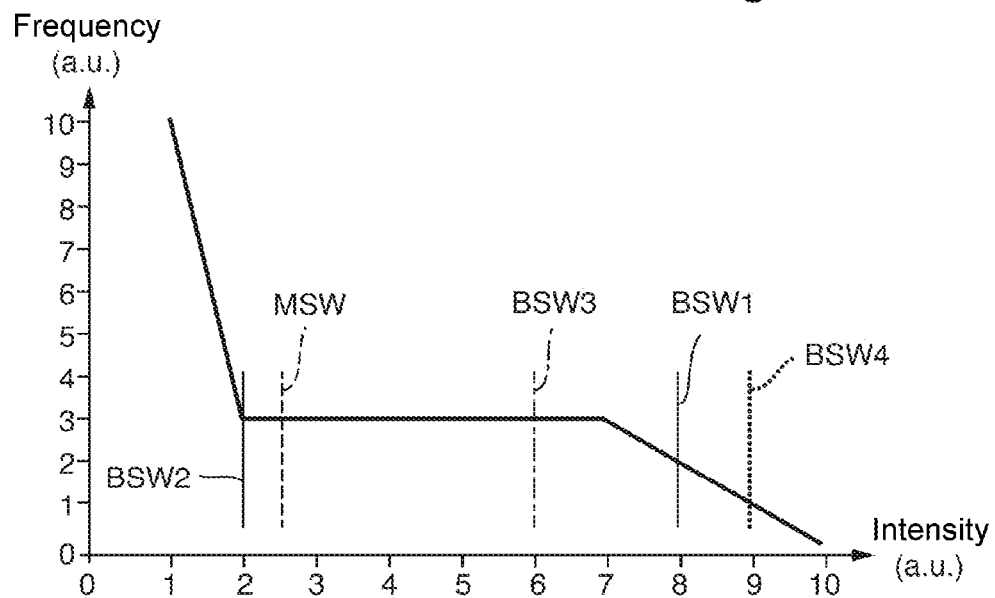
FIG. 4 shows a spectrum of a frequency of measurement pulses against an intensity of the measurement pulses.

In detail, a high temperature operation threshold BSW3 for the high temperature measurement information item HTMI is elevated in relation to the measurement threshold MSW for the measurement information item MI, as shown in FIG. 4 in the spectrum of a frequency of measurement pulses against an intensity of the measurement pulses. Additionally, a closed-loop control operation threshold BSW1 for the closed-loop control information item RI is elevated, more particularly elevated again, in relation to the measurement threshold MSW for the measurement information item MI. Further additionally, a cosmic ray operation threshold BSW4 for the cosmic ray information item HSI is elevated, more particularly elevated again, in relation to the measurement threshold MSW for the measurement information item MI. Further additionally, a noise edge position operation threshold BSW2 for the noise edge position information item RKPI is lowered in relation to the measurement threshold MSW for the measurement information item MI.

In alternative exemplary embodiments, the at least one operating variable signal may include the closed-loop control information item, the noise edge position information item, the high temperature measurement information item and/or the cosmic ray information item.

Expressed differently: the second signal processing unit 4b in the shown exemplary embodiment is embodied to process the sensor signal SES into four operating variable signals BGS1, BGS2, BGS3, BGS4 in four operation settings BE1, BE2, BE3, BE4. The setting unit 5 is embodied to set the second signal processing unit 4b into the four operation settings BE1, BE2, BE3, BE4 in operating variable time intervals BZI1, BZI2, BZI3, BZI4. In detail, the threshold SW of the comparator 7b of the second signal processing unit 4b is adjustable to the four operation thresholds BSW1, BSW2, BSW3, BSW4 for the four operation settings BE1, BE2, BE3, BE4.

In alternative exemplary embodiments, the second signal processing unit can be embodied to process the sensor signal into only a single operating variable signal or into two, three or at least five operating variable signals in only a single operation setting or in two, three or at least five operation settings. The setting unit can be embodied to set the second signal processing unit into the one operation setting or into the two, three or at least five operation settings in operating variable time intervals. In detail, the threshold of the comparator of the second signal processing unit can be adjustable to only a single operation threshold or to two, three or at least five operation thresholds for the one operation setting or for the two, three or at least five operation settings.

In a time interval I shown in FIG. 5, in particular in a measured variable time interval MZI, the setting unit 5 sets the second signal processing unit 4b into the measurement setting ME, more particularly adjusts the threshold SW of the comparator 7b of the second signal processing unit 4b to the measurement threshold MSW. Consequently, in the time interval I, the second signal processing unit 4b processes the sensor signal SES into the second measured variable signal MGSb including the measurement information item MI.

In a subsequent time interval II, in particular in a closed-loop control operating variable time interval BZI1, the setting unit 5 sets the second signal processing unit 4b into the closed-loop control operation setting BE1, more particularly adjusts the threshold SW to the closed-loop control operation threshold BSW1. Consequently, in the time interval II, the second signal processing unit 4b processes the sensor signal SES into the closed-loop control operating variable signal BGS1 including the closed-loop control information item RI.

In a subsequent time interval III, in particular in a high temperature operating variable time interval BZI3, the setting unit 5 sets the second signal processing unit 4b into the high temperature operation setting BE3, more particularly adjusts the threshold SW to the high temperature operation threshold BSW3. Consequently, in the time interval III, the second signal processing unit 4b processes the sensor signal SES into the high temperature operating variable signal BGS3 including the high temperature measurement information item HTMI.

In a subsequent time interval IV, in particular in a noise edge position operating variable time interval BZI2, the setting unit 5 sets the second signal processing unit 4b into the noise edge position operation setting BE2, more particularly adjusts the threshold SW to the noise edge position operation threshold BSW2. Consequently, in the time interval IV, the second signal processing unit 4b processes the sensor signal SES into the noise edge position operating variable signal BGS3 including the noise edge position information item RKPI.

In a subsequent time interval V, in particular in a closed-loop control operating variable time interval BZI1, the setting unit 5 sets the second signal processing unit 4b into the closed-loop control operation setting BE1, more particularly again. Consequently, in the time interval V, the second signal processing unit 4b processes the sensor signal SES into the closed-loop control operating variable signal BGS1 including the closed-loop control information item RI, more particularly again.

In a subsequent time interval VI, in particular in a high temperature operating variable time interval BZI3, the setting unit 5 sets the second signal processing unit 4b into the high temperature operation setting BE3, more particularly again. Consequently, in the time interval VI, the second signal processing unit 4b processes the sensor signal SES into the high temperature operating variable signal BGS3 including the high temperature measurement information item HTMI, more particularly again.

In a subsequent time interval VII, in particular in a cosmic ray operating variable time interval BZI4, the setting unit 5 sets the second signal processing unit 4b into the cosmic ray operation setting BE4, more particularly adjusts the threshold SW to the cosmic ray operation threshold BSW4. Consequently, in the time interval VII, the second signal processing unit 4b processes the sensor signal SES into the cosmic ray operating variable signal BGS4 including the cosmic ray information item HSI.

In a subsequent time interval VIII, in particular in a measured variable time interval MZI, the setting unit 5 sets the second signal processing unit 4b into the measurement setting ME, more particularly again. Consequently, in the time interval VIII, the second signal processing unit 4b processes the sensor signal SES into the second measured variable signal MGSb including the measurement information item MI, more particularly again.

The first signal processing unit 4a processes the sensor signal SES into the first measured variable signal MGSa in the time intervals I to VIII.

Moreover, the assessment unit 6 is embodied to monitor the noise edge position information item RKPI in respect of whether a noise edge position threshold RKPSW is reached and/or exceeded. Should the noise edge position threshold RKPSW be reached and/or exceeded, the setting unit 5 is embodied to lengthen, more particularly double, a ratio of a time duration ZDB of the operating variable time intervals BZI3 for processing the operating variable signal BGS3 containing the high temperature measurement information item HTMI to a time duration ZDM of the measured variable time intervals MZI in relation to the undershot case, as shown in FIGS. 5 and 6.

In detail, FIG. 5 shows the case where this is undershot and FIG. 6 shows the case where this is reached and/or exceeded.

In a time interval I shown in FIG. 6, in particular in a measured variable time interval MZI, the setting unit 5 sets the second signal processing unit 4b into the measurement setting ME. Consequently, in the time interval I, the second signal processing unit 4b processes the sensor signal SES into the second measured variable signal MGSb including the measurement information item MI.

In a subsequent time interval II, in particular in a high temperature operating variable time interval BZI3, more particularly a high temperature operating variable time interval that has been lengthened in time, the setting unit 5 sets the second signal processing unit 4b into the high temperature operation setting BE3. Consequently, in the time interval II, the second signal processing unit 4b processes the sensor signal SES into the high temperature operating variable signal BGS3 including the high temperature measurement information item HTMI.

In a subsequent time interval III, in particular in a noise edge position operating variable time interval BZI2, the setting unit 5 sets the second signal processing unit 4b into the noise edge position operation setting BE2. Consequently, in the time interval III, the second signal processing unit 4b processes the sensor signal SES into the noise edge position operating variable signal BGS3 including the noise edge position information item RKPI.

In a subsequent time interval IV, in particular in a high temperature operating variable time interval BZI3, more particularly a high temperature operating variable time interval that has been lengthened in time, the setting unit 5 sets the second signal processing unit 4b into the high temperature operation setting BE3, more particularly again. Consequently, in the time interval IV, the second signal processing unit 4b processes the sensor signal SES into the high temperature operating variable signal BGS3 including the high temperature measurement information item HTMI, more particularly again.

In a subsequent time interval V, in particular in a closed-loop control operating variable time interval BZI1, the setting unit 5 sets the second signal processing unit 4b into the closed-loop control operation setting BE1. Consequently, in the time interval V, the second signal processing unit 4b processes the sensor signal SES into the closed-loop control operating variable signal BGS1 including the closed-loop control information item RI.

In a subsequent time interval VI, in particular in a high temperature operating variable time interval BZI3, more particularly a high temperature operating variable time interval that has been lengthened in time, the setting unit 5 sets the second signal processing unit 4b into the high temperature operation setting BE3, more particularly again. Consequently, in the time interval VI, the second signal processing unit 4b processes the sensor signal SES into the high temperature operating variable signal BGS3 including the high temperature measurement information item HTMI, more particularly again.

In a subsequent time interval VII, in particular in a cosmic ray operating variable time interval BZI4, the setting unit 5 sets the second signal processing unit 4b into the cosmic ray operation setting BE4. Consequently, in the time interval VII, the second signal processing unit 4b processes the sensor signal SES into the cosmic ray operating variable signal BGS4 including the cosmic ray information item HSI.

In a subsequent time interval VIII, in particular in a high temperature operating variable time interval BZI3, more particularly a high temperature operating variable time interval that has been lengthened in time, the setting unit 5 sets the second signal processing unit 4b into the high temperature operation setting BE3, more particularly again. Consequently, in the time interval VIII, the second signal processing unit 4b processes the sensor signal SES into the high temperature operating variable signal BGS3 including the high temperature measurement information item HTMI, more particularly again.

In a subsequent time interval IX, in particular in a measured variable time interval MZI, the setting unit 5 sets the second signal processing unit 4b into the measurement setting ME, more particularly again. Consequently, in the time interval IX, the second signal processing unit 4b processes the sensor signal SES into the second measured variable signal MGSb including the measurement information item MI, more particularly again.

The first signal processing unit 4a processes the sensor signal SES into the first measured variable signal MGSa in the time intervals I to IX.

Moreover, the measured variable time intervals MZI have a different time duration ZDM, more particularly a shorter time duration, than the operating variable time intervals BZI1, BZI2, BZI3, BZI4.

In detail, the measured variable time intervals MZI have a time duration ZDM from 10 ms to 300 s.

Further, the operating variable time intervals BZI1, BZI2, BZI3, BZI4 have a time duration ZDB from 50 ms to 900 s.

Moreover, the optoelectronic sensor device 3 in the shown exemplary embodiment comprises at least one silicon photomultiplier 15, as shown in FIG. 1. In alternative exemplary embodiments, the optoelectronic sensor device may comprise at least one photodiode.

Moreover, in the shown exemplary embodiment, the radiometric measuring apparatus 1 is embodied to determine, particularly in the undershot case, a measured variable value MGW of the measured variable MG on the basis of the first measured variable signal MGSa and/or the second measured variable signal MGSb, more particularly on the basis of the measurement information item MI. In alternative exemplary embodiments, the first measured variable signal and the second measured variable signal may contain a measured variable value of the measured variable.

Additionally, the radiometric measuring apparatus 1 in the shown exemplary embodiment is embodied to determine, particularly in the reached and/or overshot case, a measured variable value MGW of the measured variable MG on the basis of the operating variable signal BGS3 including the high temperature measurement information item HTMI.

In detail, the radiometric measuring apparatus 1 comprises at least one counter 12 and at least one analog-to-digital converter 13 for determining the measured variable value MGW on the basis of the first measured variable signal MGSa and/or the second measured variable signal MGSb, more particularly on the basis of the measurement information item MI, in particular in the undershot case.

Additionally, the at least one counter 12 and the at least one analog-to-digital converter 13 are embodied in the shown exemplary embodiment to determine the measured variable value MGW on the basis of the operating variable signal BGS3 including the high temperature measurement information item HTMI, particularly in the reached and/or overshot case.

In the shown exemplary embodiment, the microcontroller μC comprises the at least one counter 12 and the at least one analog-to-digital converter 13.

In the undershot case shown in FIG. 5, the radiometric measuring apparatus 1 determines the measured variable value MGW on the basis of the first measured variable signal MGSa and/or the second measured variable signal MGSb, more particularly on the basis of the measurement information item MI, in particular by means of the at least one counter 12 and the at least one analog-to-digital converter 13. In the reached and/or exceeded case shown in FIG. 6, the radiometric measuring apparatus 1 determines the measured variable value MGW on the basis of the operating variable signal BGS3 including the high temperature measurement information item HTMI, in particular by means of the at least one counter 12 and the at least one analog-to-digital converter 13.

Moreover, the radiometric measuring apparatus 1 comprises an interface 9, as shown in FIG. 1. The interface 9 is embodied to couple the radiometric measuring apparatus 1 to a receiver 10 for data transfer purposes, in particular for transferring the measured variable value MGW of the measured variable MG. The radiometric measuring apparatus 1 is embodied to be supplied with electrical power by way of its interface 9 only, in particular by way of the receiver 10.

In the shown exemplary embodiment, the interface 9 is electrically coupled to the microcontroller μC, as indicated by a solid line in FIG. 1.

In FIG. 1, the radiometric measuring apparatus 1 is electrically coupled to the receiver 10 via the interface 9, as indicated by a solid line in FIG. 1. Further, the radiometric measuring apparatus 1 transfers the measured variable value MGW to the receiver 10 in particular, in particular by means of the interface 9. Moreover, the radiometric measuring apparatus 1 is supplied with electrical power via its interface 9 only.

Moreover, the radiometric measuring apparatus 1 comprises a malfunction output and/or transfer unit 11, as shown in FIG. 1. The malfunction output and/or transfer unit 11 is embodied to output and/or transfer a malfunction signal FFS, in particular by means of the interface 9, in particular to the receiver 10, if the first signal processing unit 4a and/or the second signal processing unit 4b is/are assessed to be processing incorrectly.

Additionally, the malfunction output and/or transfer unit 11 is embodied in the shown exemplary embodiment to output and/or transfer a noise or high temperature signal, in particular by means of the interface 9, in particular to the receiver 10, if the noise edge position threshold RKPSW is reached and/or exceeded by the noise edge position information item RKPI.

In the shown exemplary embodiment, the microcontroller μC comprises the malfunction output and/or transfer unit 11.

Moreover, the radiometric measuring apparatus 1 comprises a common housing 14, in particular in the form of an explosion prevention housing, as shown in FIG. 1. The scintillator device 2, the optoelectronic sensor device 3, the first signal processing unit 4a, the second signal processing unit 4b, the setting unit 5 and the assessment unit 6 or the microcontroller μC are disposed in the common housing 14.

Additionally, the interface 9, the malfunction output and/or transfer unit 11, the at least one counter 12 and the at least one analog-to-digital converter 13 are disposed in the common housing 14 in the shown exemplary embodiment.

As the exemplary embodiments shown and explained above elucidate, the invention provides an advantageous radiometric measuring apparatus for detecting a measured variable in the form of a fill level, a point level, a density and/or a mass flow, said radiometric measuring apparatus having improved properties, more particularly having a relatively large functional scope and being functionally safe, particularly in the case of only two signal processing units, and having a relatively low power consumption.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radiometric measuring apparatus for detecting a measured variable in the form of a fill level, a point level, a density and/or a mass flow, the radiometric measuring apparatus comprising:
   a scintillator device, wherein the scintillator device is embodied to generate light pulses upon excitation by ionizing radiation;
   an optoelectronic sensor device, wherein the optoelectronic sensor device is embodied to convert the light pulses into a sensor signal;
   a first signal processing unit, wherein the first signal processing unit is embodied to process the sensor signal into a first measured variable signal;
   an adjustable second signal processing unit, wherein the second signal processing unit is embodied in a measurement setting to process the sensor signal into a second measured variable signal, wherein the second measured variable signal corresponds to the first measured variable signal in the case of a correctly processing first signal processing unit and a correctly processing second signal processing unit, and embodied in at least one operation setting to process the sensor signal into at least one operating variable signal, wherein the at least one operating variable signal does not correspond to the measured variable signals;
   a setting unit, wherein the setting unit is embodied to set the second signal processing unit into the measurement setting in measured variable time intervals and into the at least one operation setting in operating variable time intervals that alternate with the measured variable time intervals; and
   an assessment unit, wherein the assessment unit is embodied to compare the first measured variable signal and the second measured variable signal with one another and to assess the first signal processing unit and/or the second signal processing unit to be processing correctly or incorrectly, depending on a result of the comparison.

2. The radiometric measuring apparatus according to claim 1, wherein
   the setting unit is embodied to repeatedly set the second signal processing unit into the measurement setting and into the at least one operation setting.

3. The radiometric measuring apparatus according to claim 1, wherein
   the first signal processing unit is embodied to process the sensor signal from a time window into the first measured variable signal,
   the second signal processing unit is embodied to process the same sensor signal from the same time window into the second measured variable signal when in the measurement setting,
   the setting unit is embodied to intermittently set the second signal processing unit into the measurement setting in such a way that the second signal processing unit processes the same sensor signal from the same time window into the second measured variable signal, and
   the assessment unit is embodied to compare the first measured variable signal and the second measured variable signal, which were both processed from the same sensor signal from the same time window, with one another.

4. The radiometric measuring apparatus according to claim 1, wherein
   the first signal processing unit is embodied to process the sensor signal into the first measured variable signal only.

5. The radiometric measuring apparatus according to claim 1, wherein
   the first signal processing unit and/or the second signal processing unit each have a comparator and/or a monostable trigger circuit.

6. The radiometric measuring apparatus according to claim 5, wherein
   a threshold of the comparator of the second signal processing unit is adjustable to a measurement threshold for the measurement setting and to at least one operation threshold that differs from the measurement threshold for the at least one operation setting.

7. The radiometric measuring apparatus according to claim 1, wherein
   the first measured variable signal and the second measured variable signal each contain a measurement information item, and/or
   the at least one operating variable signal contains a closed-loop control information item, a noise edge position information item, a high temperature measurement information item and/or a cosmic ray information item.

8. The radiometric measuring apparatus according to claim 7, wherein
the assessment unit is embodied to monitor the noise edge position information item in respect of whether a noise edge position threshold is reached and/or exceeded, and
should the noise edge position threshold be reached and/or exceeded, the setting unit is embodied to lengthen a ratio of a time duration of the operating variable time intervals for processing the operating variable signal containing the high temperature measurement information item to a time duration of the measured variable time intervals in relation to the undershot case.

9. The radiometric measuring apparatus according to claim 1, wherein one or more of:
the measured variable time intervals have a different time duration than the operating variable time intervals,
the measured variable time intervals have a time duration from 10 ms to 300 s, and
the operating variable time intervals have a time duration from 50 ms to 900 s.

10. The radiometric measuring apparatus according to claim 1, wherein
the optoelectronic sensor device comprises at least one photodiode.

11. The radiometric measuring apparatus according to claim 1, further comprising:
an interface, wherein the interface is embodied to couple the radiometric measuring apparatus to a receiver for data transfer purposes, and
wherein the radiometric measuring apparatus is embodied to be supplied with electrical power via its interface only.

12. The radiometric measuring apparatus according to claim 1, further comprising:
a malfunction output and/or transfer unit, wherein the malfunction output and/or transfer unit is embodied to output and/or transfer a malfunction signal if the first signal processing unit and/or the second signal processing unit are assessed to be processing incorrectly.

13. The radiometric measuring apparatus according to claim 1, wherein
the first measured variable signal and the second measured variable signal contain a measured variable value of the measured variable, and/or
the radiometric measuring apparatus is embodied to determine a measured variable value of the measured variable on the basis of the first measured variable signal and/or the second measured variable signal.

14. The radiometric measuring apparatus according to claim 13, further comprising:
at least one counter and/or at least one analog-to-digital converter for determining the measured variable value on the basis of the first measured variable signal and/or the second measured variable signal.

15. The radiometric measuring apparatus according to claim 1, further comprising:
a common housing,
wherein the scintillator device, the optoelectronic sensor device, the first signal processing unit, the second signal processing unit, the setting unit and the assessment unit are disposed in the common housing.

16. The radiometric measuring apparatus according to claim 10, wherein
the optoelectronic sensor device comprises at least one avalanche photodiode.

17. The radiometric measuring apparatus according to claim 10, wherein
the optoelectronic sensor device comprises at least one array of photodiodes.

18. The radiometric measuring apparatus according to claim 10, wherein
the optoelectronic sensor device comprises at least one silicon photomultiplier.

* * * * *